United States Patent
Saunders et al.

(10) Patent No.: US 7,854,296 B2
(45) Date of Patent: Dec. 21, 2010

(54) PASSIVE SECONDARY AIR MUFFLER

(75) Inventors: Troy M. Saunders, Howell, MI (US); Ronald J. Donahue, Fond Du Lac, WI (US)

(73) Assignee: Certified Ports Corporation, Janesville, WI (US)

( * ) Notice: Subject to any disclaimer, the term of this patent is extended or adjusted under 35 U.S.C. 154(b) by 0 days.

(21) Appl. No.: 12/044,088

(22) Filed: Mar. 7, 2008

(65) Prior Publication Data

US 2008/0245604 A1 Oct. 9, 2008

Related U.S. Application Data

(63) Continuation of application No. 11/844,411, filed on Aug. 24, 2007, now abandoned.

(60) Provisional application No. 60/823,793, filed on Aug. 29, 2006.

(51) Int. Cl.
 *F01N 13/10* (2010.01)
(52) U.S. Cl. .............. 181/240; 181/231; 181/262; 60/302
(58) Field of Classification Search .......... 181/240, 181/262, 231; 60/302
See application file for complete search history.

(56) References Cited

U.S. PATENT DOCUMENTS

| | | | | |
|---|---|---|---|---|
| 3,656,915 A | * | 4/1972 | Tourtellotte | 422/171 |
| 3,872,666 A | * | 3/1975 | Bentley | 60/277 |
| 4,008,570 A | * | 2/1977 | Harada | 60/299 |
| 4,094,645 A | * | 6/1978 | Bailey | 422/180 |
| 4,231,221 A | * | 11/1980 | Mathner et al. | 60/319 |
| 4,388,804 A | * | 6/1983 | Bushmeyer | 60/319 |
| 4,693,337 A | * | 9/1987 | Timmermeister | 181/231 |
| 4,846,301 A | * | 7/1989 | Granath et al. | 181/230 |
| 4,867,270 A | * | 9/1989 | Wissmann et al. | 181/231 |
| 4,887,427 A | * | 12/1989 | Shinzawa et al. | 60/286 |
| 4,890,690 A | * | 1/1990 | Fischer et al. | 181/240 |

(Continued)

FOREIGN PATENT DOCUMENTS

EP 1 703 099 9/2006

(Continued)

OTHER PUBLICATIONS

=Foreign patent document together with English language abstract.

*Primary Examiner*—Elvin G Enad
*Assistant Examiner*—Forrest M Phillips
(74) *Attorney, Agent, or Firm*—Boyle Fredrickson, S.C.

(57) ABSTRACT

A passive secondary air muffler for a small internal combustion engine. The secondary air muffler may include a venturi device and a catalytic converter. The venturi device may be in the form of a stamped sheet metal insert which, along with the outer muffler housing or shell, forms a secondary or auxiliary air intake device. The venturi device may also be formed from baffles separating an inlet chamber from an outlet chamber of the muffler. The secondary air intake device provides auxiliary or secondary air to the exhaust gas stream exiting the engine upstream of the catalytic converter to improve the efficiency of the catalytic converter. In an exemplary embodiment, the venturi device has a hemispherical cross-sectional shape or a circular cross-sectional shape taken along a plane substantially perpendicular to the direction of flow of the exhaust gas stream.

5 Claims, 7 Drawing Sheets

U.S. PATENT DOCUMENTS

| | | | |
|---|---|---|---|
| 4,901,815 A * | 2/1990 | Harwood et al. | 181/282 |
| 4,930,678 A * | 6/1990 | Cyb | 228/176 |
| 5,174,113 A * | 12/1992 | Deville | 60/309 |
| 5,177,962 A * | 1/1993 | Hall et al. | 60/311 |
| 5,338,903 A * | 8/1994 | Winberg | 181/231 |
| 5,339,629 A * | 8/1994 | Winberg et al. | 60/299 |
| 5,351,483 A * | 10/1994 | Riley et al. | 60/274 |
| 5,373,119 A * | 12/1994 | Suzuki et al. | 181/230 |
| 5,451,728 A * | 9/1995 | Chandler et al. | 181/230 |
| 5,521,339 A * | 5/1996 | Despain et al. | 181/230 |
| 5,736,690 A * | 4/1998 | Karlsson | 181/230 |
| 5,738,184 A * | 4/1998 | Masuda et al. | 181/262 |
| 5,857,327 A * | 1/1999 | Sato et al. | 60/302 |
| 5,866,859 A * | 2/1999 | Karlsson et al. | 181/230 |
| 5,887,424 A * | 3/1999 | Kuroshita | 60/293 |
| 5,996,732 A * | 12/1999 | Burger et al. | 181/230 |
| 6,044,926 A * | 4/2000 | Yamane et al. | 181/230 |
| 6,164,066 A * | 12/2000 | Sakaguchi et al. | 60/302 |
| 6,170,604 B1 * | 1/2001 | Menzel et al. | 181/230 |
| 6,250,075 B1 * | 6/2001 | Funakoshi et al. | 60/299 |
| 6,341,662 B1 * | 1/2002 | Karlsson | 181/230 |
| 6,393,835 B1 * | 5/2002 | Stoll et al. | 60/299 |
| 6,478,577 B1 * | 11/2002 | Maricic et al. | 431/353 |
| 6,789,644 B2 * | 9/2004 | Mukaida | 181/272 |
| 6,955,043 B2 * | 10/2005 | Schlossarczyk et al. | 60/299 |
| 6,978,605 B2 * | 12/2005 | Chiba et al. | 60/302 |
| 7,051,524 B1 * | 5/2006 | Kraft | 60/324 |
| 7,228,935 B2 * | 6/2007 | Schlessmann | 181/212 |
| 7,296,657 B2 * | 11/2007 | Ohno et al. | 181/272 |
| 7,357,221 B2 * | 4/2008 | Maier | 181/268 |
| 7,413,716 B2 * | 8/2008 | Mavinahally et al. | 422/177 |
| 2001/0037912 A1 * | 11/2001 | Menzel | 181/231 |
| 2002/0116919 A1 * | 8/2002 | Rosel et al. | 60/285 |
| 2004/0154289 A1 * | 8/2004 | Schlossarczyk et al. | 60/299 |
| 2005/0189167 A1 * | 9/2005 | Bozzi et al. | 181/240 |
| 2005/0284140 A1 * | 12/2005 | Radel et al. | 60/299 |
| 2006/0102420 A1 * | 5/2006 | Huber et al. | 181/231 |

FOREIGN PATENT DOCUMENTS

| | | | |
|---|---|---|---|
| JP | 04027707 A | * | 1/1992 |
| JP | 9-158722 | | 6/1997 |
| WO | 96/12877 | | 5/1996 |

* cited by examiner

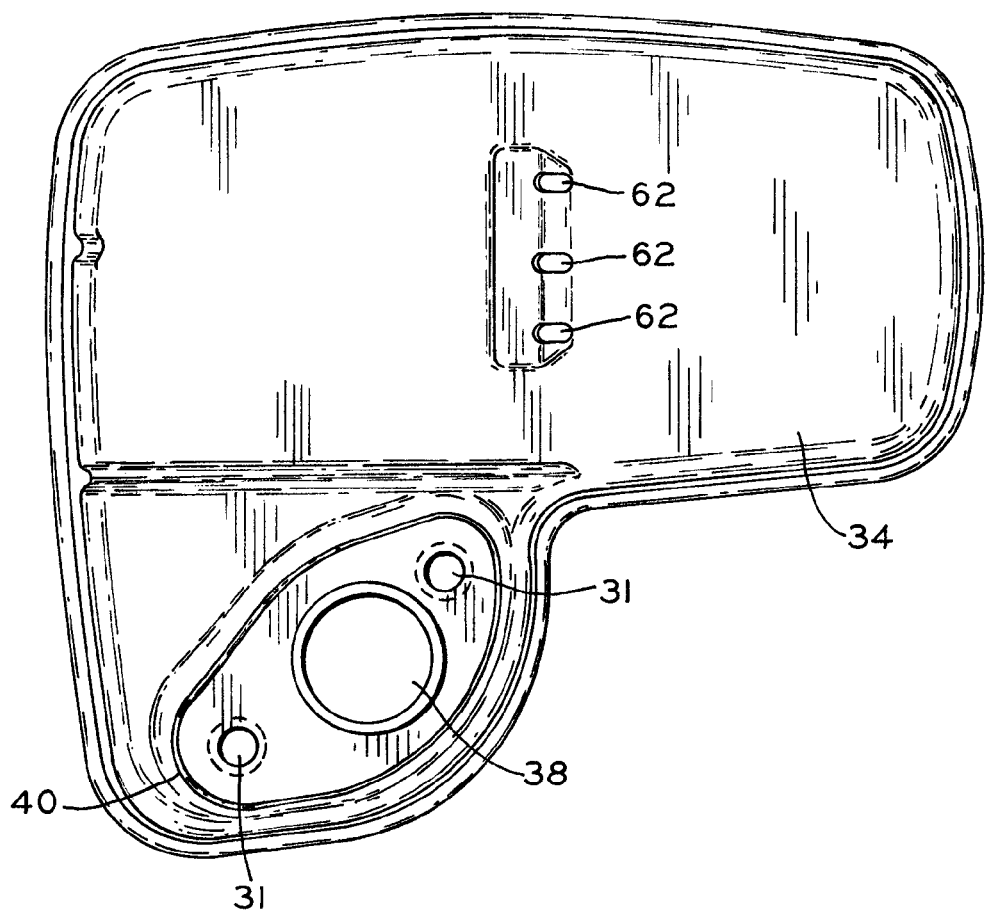
FIG_3

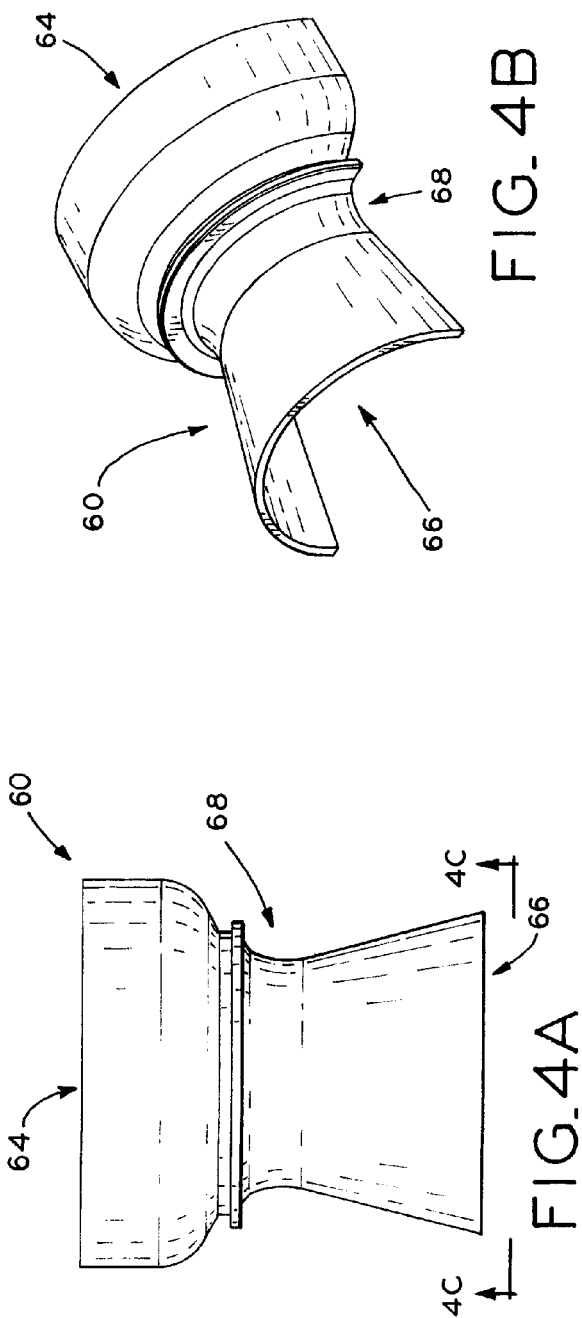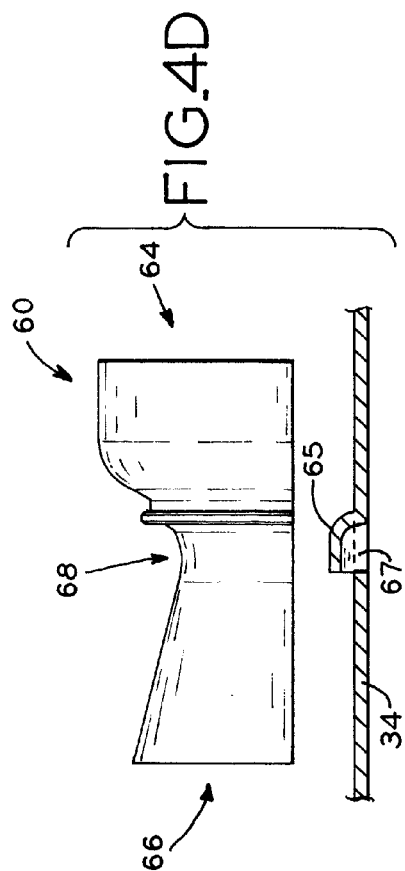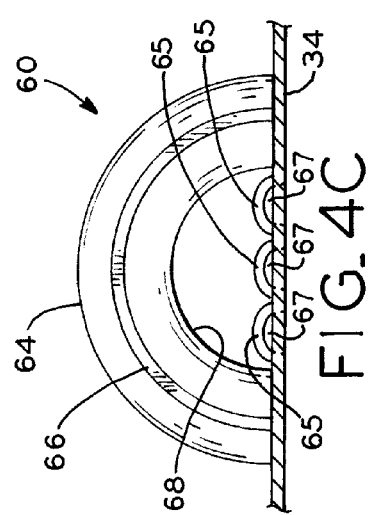

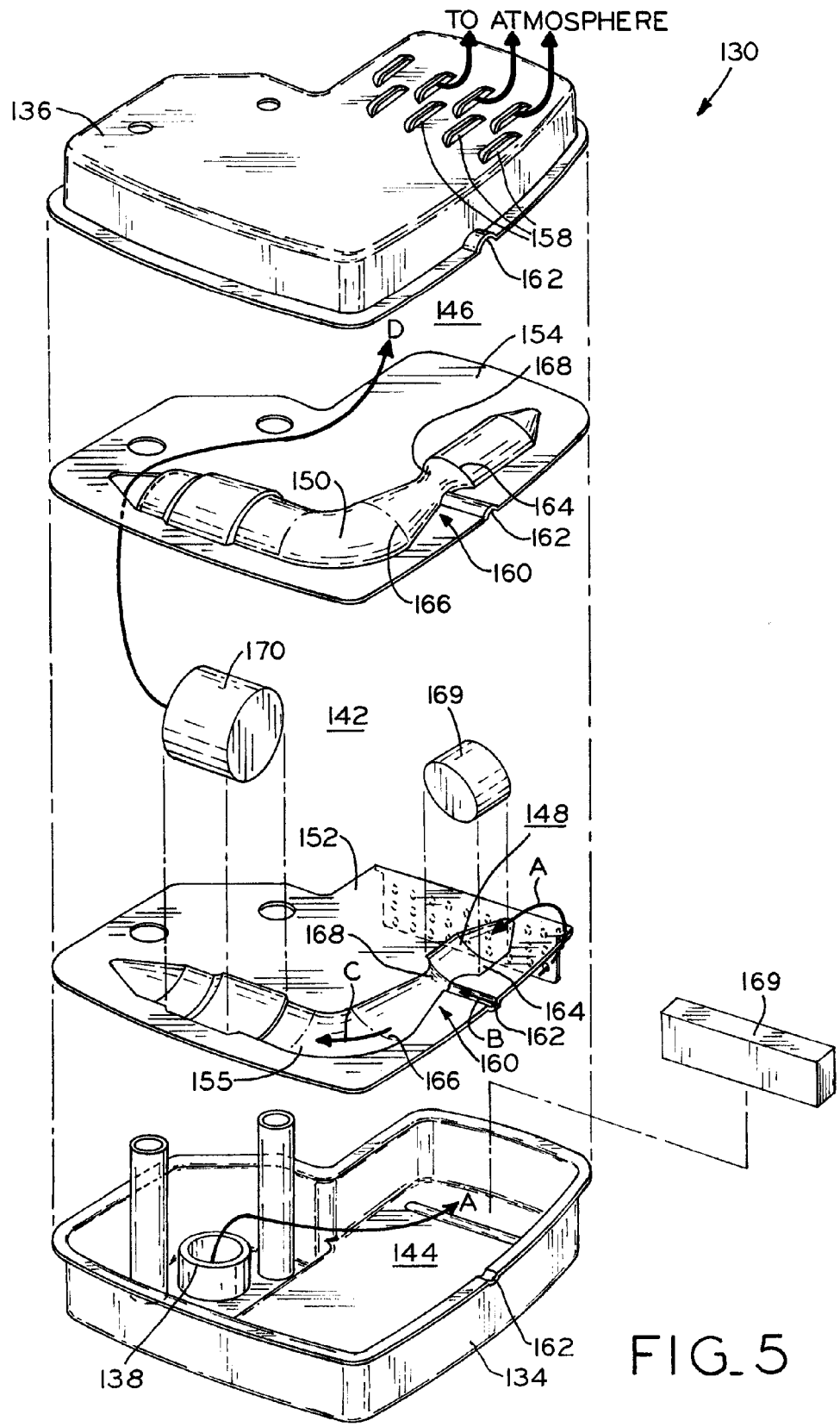
FIG_5

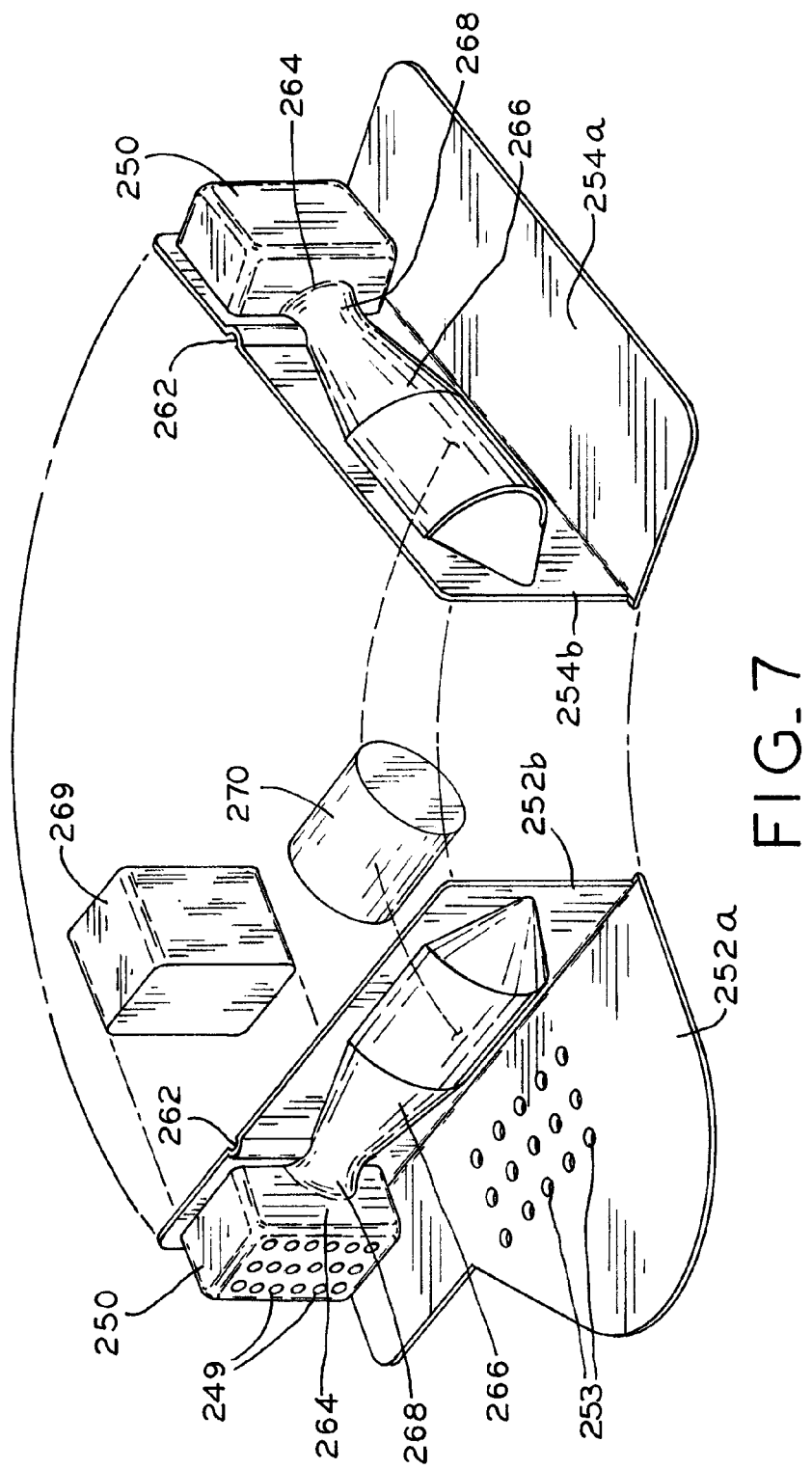

PASSIVE SECONDARY AIR MUFFLER

CROSS REFERENCE TO RELATED APPLICATIONS

This application is a continuation of U.S. patent application Ser. No. 11/844,411, entitled PASSIVE SECONDARY AIR MUFFLER, filed Aug. 24, 2007, which claims the benefit under Title 35, U.S.C. §119(e) of U.S. Provisional Patent Application Ser. No. 60/823,793, entitled PASSIVE SECONDARY AIR MUFFLER, filed on Aug. 29, 2006. The disclosure of the foregoing references are hereby incorporated by reference herein.

BACKGROUND

1. Field of the Invention

The present invention relates to small internal combustion engines of the type used with lawnmowers, lawn tractors, other utility implements, and in sport vehicles, for example. In particular, the present invention relates to a passive secondary air muffler for such engines.

2. Description of the Related Art

Small internal combustion engines of the type used with lawnmowers, lawn tractors, other small utility implements, or in sport vehicles typically include an intake system including a carburetor attached to the engine which mixes liquid fuel with atmospheric air to form a fuel/air mixture which is drawn into the engine for combustion. In some air-cooled small engines, a relatively rich combustion mixture may be provided to ensure adequate performance while preventing the engine from overheating. Combustion of the fuel/air mixture produces exhaust emissions which leave the engine via an exhaust port, to which a muffler is attached.

One way to reduce the exhaust emissions of an internal combustion engine is to use a catalytic converter to treat the exhaust emissions of the engine. For small internal combustion engines, it is often desirable to combine the catalytic converter with a muffler into a single, compact unit. In such mufflers, if often necessary to introduce auxiliary or secondary air from the atmosphere into the exhaust gas stream upstream of the catalytic converter to provide oxygen for conversion of residual hydrocarbons in the catalytic converter.

What is needed is a secondary air muffler which improves the efficiency of the catalytic converter and is inexpensive to manufacture.

SUMMARY

The present invention provides a passive secondary air muffler for a small internal combustion engine. The secondary air muffler may include a venturi device and a catalytic converter. The venturi device may be in the form of a stamped sheet metal insert which, along with the outer muffler housing or shell, forms a secondary or auxiliary air intake device. The venturi device may also be formed from baffles separating an inlet chamber from an outlet chamber of the muffler. The secondary air intake device provides auxiliary or secondary air to the exhaust gas stream exiting the engine upstream of the catalytic converter to improve the efficiency of the catalytic converter. In an exemplary embodiment, the venturi device has a hemispherical cross-sectional shape or a circular cross-sectional shape taken along a plane substantially perpendicular to the direction of flow of the exhaust gas stream.

In one form thereof, the present invention provides an internal combustion engine, including a muffler attached to the engine, the muffler including an outer shell having an inlet, an outlet, and at least one auxiliary air inlet, the outer shell including a first chamber in fluid communication with the inlet and a second chamber in fluid communication with the outlet; an auxiliary air intake device associated with the muffler and disposed within the outer shell between the first chamber and the second chamber, the auxiliary air intake device including an inlet portion in fluid communication with the first chamber, an outlet portion in fluid communication with the second chamber, and a restriction portion disposed between the inlet and outlet portions, the restriction portion disposed adjacent the at least one auxiliary air inlet in the outer shell; and a catalytic converter disposed within the muffler outer shell downstream of the auxiliary air intake device, whereby exhaust gases passing through the auxiliary air intake device draw in auxiliary air through the at least one auxiliary air inlet prior to passing through the catalytic converter.

In another form thereof, the present invention provides an internal combustion engine, including a muffler attached to the engine, the muffler including an outer shell having an inlet, an outlet, and at least one auxiliary air inlet, the outer shell including a first chamber in fluid communication with the inlet and a second chamber in fluid communication with the outlet; and an auxiliary air intake device associated with the muffler and disposed within the outer shell between the first chamber and the second chamber, the auxiliary air intake device including an inlet portion in fluid communication with the first chamber, an outlet portion in fluid communication with the second chamber, and a restriction portion disposed between the inlet and outlet portions, the restriction portion disposed adjacent the at least one auxiliary air inlet in the outer shell, the auxiliary air intake device defining a substantially semicircular cross-sectional shape.

In yet another form thereof, the present invention provides an internal combustion engine, including a muffler attached to the engine, the muffler including an outer shell having an inlet, an outlet, and at least one auxiliary air inlet, the outer shell including a first chamber in fluid communication with the inlet and a second chamber in fluid communication with the outlet; and an auxiliary air intake device associated with the muffler and disposed within the outer shell between the first chamber and the second chamber, the auxiliary air intake device including an inlet portion in fluid communication with the first chamber, an outlet portion in fluid communication with the second chamber, and a restriction portion disposed between the inlet and outlet portions, the restriction portion disposed adjacent the at least one auxiliary air inlet in the outer shell, the auxiliary air intake device defining a substantially circular cross-sectional shape.

Advantageously, the secondary air intake device eliminates the need to supply an external pump with the muffler to provide the auxiliary or secondary air to the exhaust gas stream, and minimizes costs associated with manufacturing the muffler by incorporating inexpensive stamped metal components into existing mufflers.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 3 is a side view of the muffler of FIG. 1, taken from a side of the muffler which faces the engine;

FIGS. 4A-4D are top, perspective, front, and side views of a secondary or auxiliary air intake device of the muffler of FIG. 1;

FIG. 5 is an exploded perspective view of an alternative embodiment muffler;

FIG. 7 is another exploded perspective view of a portion of the muffler of FIG. 6.

Corresponding reference characters indicate corresponding parts throughout the several views. The exemplifications set out herein illustrate several exemplary embodiments, and such exemplifications are not to be construed as limiting the scope of the invention in any manner.

DETAILED DESCRIPTION

Figure 1:
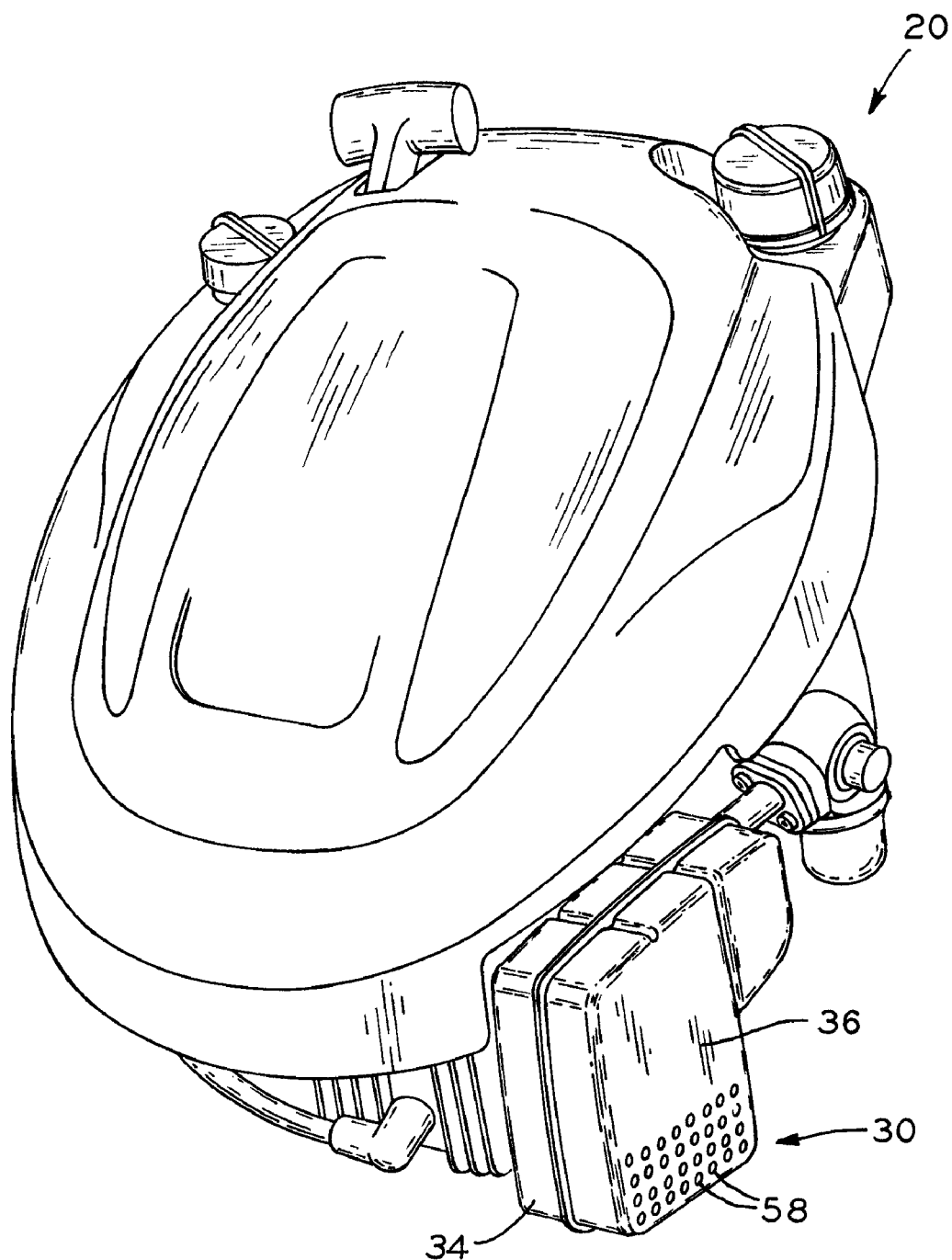
FIG. 1 is a perspective view of a small, single cylinder internal combustion engine having a muffler in accordance with the present invention.

Referring to FIG. 1, muffler 30 is shown affixed to small internal combustion engine 20 via through-bolts (not shown) inserted through muffler 30 via apertures 31 (FIGS. 2 and 3) and into the exhaust port flange of the exhaust port (not shown) of the engine cylinder. Engine 20 is shown herein as a vertical crankshaft engine. However, the muffler of the present invention is equally applicable to horizontal crankshaft engines, as well as engines having one, two, or multiple cylinders of the type commonly used with a variety of different types of implements, including lawnmowers, lawn and garden tractors, snow throwers, compressors, generators, and the like.

Figure 2:
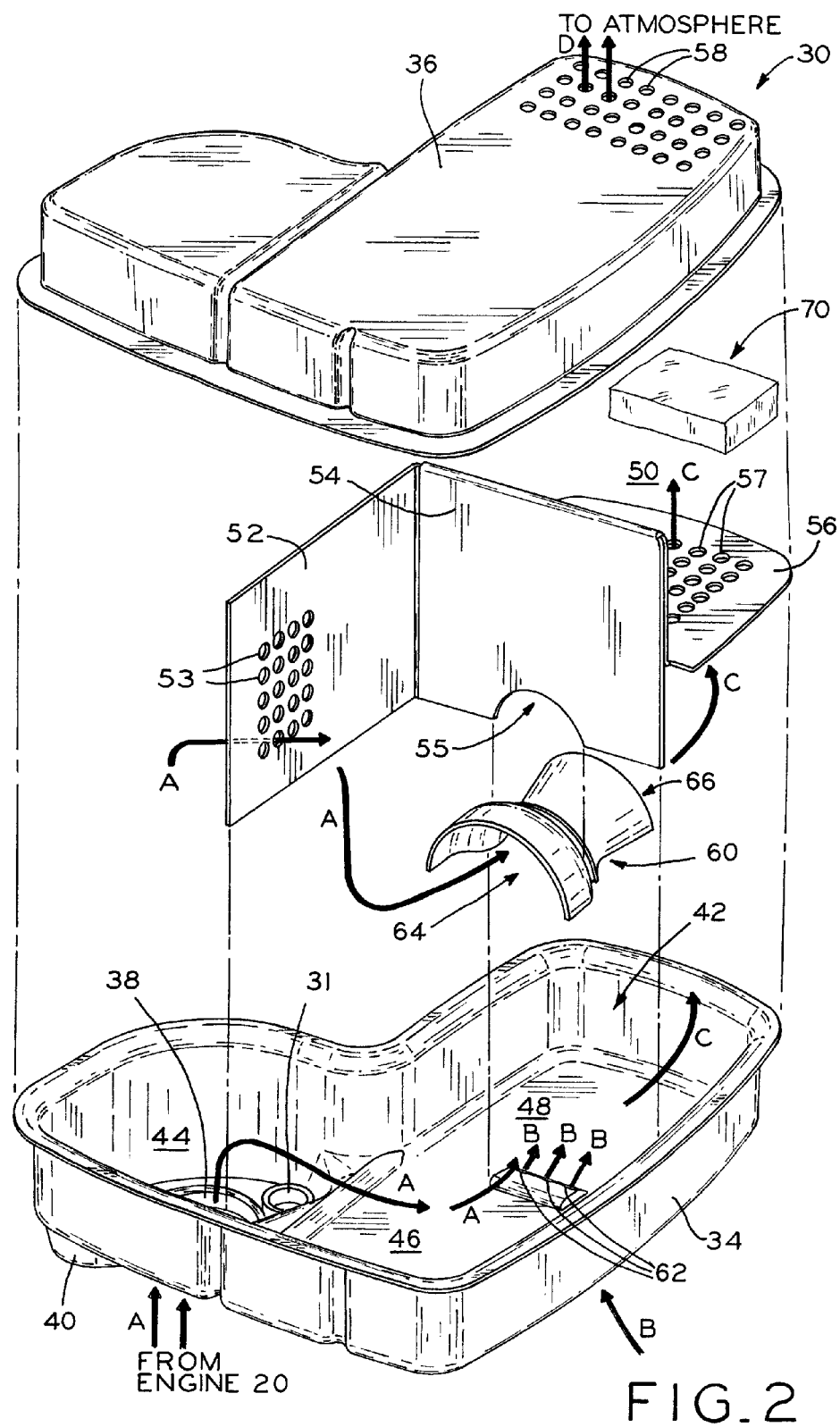
FIG. 2 is an exploded perspective view of the muffler of FIG. 1.

Referring now to FIGS. 1 and 2, muffler 30 includes an outer shell including first housing 34 and second housing 36 attached to one another via welding, crimping, by fasteners, or in another suitable manner. First housing 34 of muffler 30 is adjacent to, and faces engine 20 and second housing 36 of muffler 30 faces away from engine 20 toward the external atmosphere. First housing 34 and second housing 36 define internal chamber 42 of muffler 30. Muffler 30 includes exhaust inlet 38 which is affixed to the exhaust port (hidden from view) of engine 20. A gasket (not shown) seals the connection between inlet 38 and the exhaust port of engine 20. Muffler 30 may also include ridge 40 which insures that muffler 30 is properly spaced from engine 20.

As shown in FIG. 2, internal chamber 42 of muffler 30 may be partitioned into several chambers in fluid communication with one another. For example, internal chamber 42 may include first chamber 44, second chamber 46, third chamber 48, and fourth chamber 50. Although shown herein as having four partitioned chambers, internal chamber 42 may define a greater or lesser number of partitioned chambers within muffler 30. Baffle 52 separates first chamber 44 and second chamber 46 and may include a plurality of apertures 53 to permit fluid communication of exhaust gases between first chamber 44 and second chamber 46, such that baffle 52 functions to at least partially block the exhaust flow from the exhaust port of the engine to provide a drop in the exhaust pressure upstream of the secondary air intake device of muffler 30, described below, without inhibiting the exhaust flow to the extent that the performance of the engine may be compromised. Alternatively, a drop in the exhaust pressure upstream of the secondary air intake device may also be provided by a wire mesh (not shown) which traps any oil entrained within the exhaust stream to thereby extend the life of the catalyst(s), or the pressure drop may be provided by a reducing catalyst, as discussed below.

Baffle 54 separates second chamber 46 and third chamber 48 and includes cutout portion 55 having a substantially hemispherical shape. Baffle 56 separates third chamber 48 and fourth chamber 50 and may include a plurality of apertures 57 to permit fluid communication between third chamber 48 and fourth chamber 50. Third chamber 48 and/or fourth chamber 50 may include catalyst 70 for performing the function of a catalytic converter, as described below. Second housing 36 may include an outlet in the form of a plurality of apertures 58 for fluid communication between fourth chamber 50 and the external atmosphere.

Internal chamber 42 may include secondary or auxiliary air intake device 60 which provides fluid communication between second chamber 46 and third chamber 48. Device 60 may be held in contact or mated with first housing 34 via an interference fit with cutout portion 55 of baffle 54. Device 60, as shown in detail in FIGS. 4A-4D, may be formed as a venturi device and may have a substantially hemispherical cross-sectional shape, as shown best in FIG. 4C. As shown in FIGS. 2 and 3, first housing 34 may include air inlet ports in the form of a plurality of apertures 62 formed therein adjacent or proximate device 60 in order to provide secondary or auxiliary air to the flow of exhaust gases through internal chamber 42 of muffler 30, as described below. In one embodiment shown in FIGS. 4A-4D, first housing 34 may include louvers 65 which define apertures 67 to facilitate inflow of secondary air into device 60 in the direction of fluid movement through device 60, as described below.

Device 60 may include inlet end 64, outlet end 66, and constricted portion 68 therebetween. In an exemplary embodiment, inlet end 64, outlet end 66, and constricted portion 68 all form a substantially hemispherical cross-sectional shape. Inlet end 64 may have a larger hemispherical cross-sectional shape than the hemispherical cross-sectional shape of outlet end 66, and constricted portion 68 has a smaller hemispherical cross-sectional shape than the hemispherical cross-sectional shapes of both inlet end 64 and outlet end 66. In an exemplary embodiment, apertures 62 are located near constricted portion 68 of device 60. In one embodiment, device 60 includes a stamped and/or formed sheet metal insert wherein device 60 has a substantially hemispherical cross-sectional size and shape at constricted portion 68 which substantially matches cutout portion 55 in baffle 54. The hemispherical cross-section of device 60 is taken along a plane substantially perpendicular to the flow of exhaust gases through device 60.

Referring again to FIG. 2, the flow of gaseous fluids through muffler 30 is shown by arrows A, B, C, and D. Untreated exhaust gases, represented by arrows A, leave engine 20 (FIG. 1) and pass through exhaust inlet 38 of muffler 30 into first chamber 44. The untreated exhaust gases then proceed into second chamber 46 via apertures 53 in baffle 52 which, as described above, reduces the exhaust pressure from the exhaust port of the engine such that subatmospheric pressures may be generated within secondary air intake device 60 to draw secondary air into the exhaust stream. Apertures 53 facilitate creation of a laminar air flow into secondary air intake device 60. First chamber 44 may optionally include a reducing catalyst upstream of secondary air intake device 60 for reducing NOx within the oxygen-deficient, rich exhaust upstream of secondary air intake device 60. The reducing catalyst may be in the form of a coated wire mesh, an oil trap, a reducing catalyst, and/or a three-way catalyst, for example. The oxygen by-product of the reducing catalyst may also facilitate the operation of a three-way or oxidizing catalyst located downstream of secondary air intake device 60.

The exhaust gases next proceed into inlet end 64 of secondary air intake device 60. As the untreated exhaust gases proceed through device 60, a venturi effect occurs when the exhaust gases move through constricted portion 68, thereby dropping the pressure of the fluid within constricted portion 68 to sub-atmospheric pressure. The drop in pressure forces secondary or auxiliary atmospheric air, represented by arrows B, to be drawn into the exhaust stream through apertures 62 in first housing 34 so that mixing of the untreated exhaust gases and the secondary air occurs in diverging section or outlet end 66. The mixing of the secondary air and the untreated exhaust gases continues in third chamber 48 disposed downstream of device 60.

The exhaust gas/secondary air mixture, represented by arrows C, then proceeds from third chamber 48 into fourth chamber 50 via apertures 57 in baffle 56. Third chamber 48 and/or fourth chamber 50 may include catalyst 70, for example, a monolithic catalyst bed or a catalytic converter, which is used to treat the exhaust gases to reduce or eliminate the hydrocarbon, carbon monoxide, and/or nitrous oxide emissions from the exhaust gases. Catalyst 70 may be in the form of a wire mesh or a ceramic or metal monolith material coated with a metal catalyst, for example, platinum, rhodium, and/or palladium, and the ceramic material may be a cell-like structure having a multiplicity of passages that extend through the structure. Catalyst 70 may be in the form of a reducing catalyst, an oxidizing, and/or a three-way catalyst, for example. The secondary air introduced into the exhaust gases upstream of the catalyst provides the necessary oxygen for the catalyst in treating the exhaust gases. The treated exhaust gas, represented by arrows D, then exits muffler 30 to the external atmosphere via apertures 58 in second housing 36.

The secondary air intake device 60 and apertures 62 may be sized to draw into the exhaust stream an amount of air sufficient to create, for example, a lean or a stoichiometric ratio between the oxygen in the secondary air and any un-combusted or partially combusted hydrocarbons in the exhaust. For a stoichiometric ratio, the catalyst 70 may be a three-way catalyst which removes NOx, hydrocarbons and carbon monoxide or, for a lean ratio, the catalyst 70 may be an oxidizing catalyst which removes hydrocarbons and carbon monoxide. Thus, the present muffler may include different arrangements of catalyst types, as desired. For example, the muffler may include only a three-way catalyst downstream of secondary air intake device 60, or may include a reducing catalyst upstream of secondary air intake device 60, together with an oxidizing catalyst downstream of secondary air intake device 60.

Referring to FIG. 5, an alternative embodiment muffler 130 includes an outer shell including first housing 134 and second housing 136 attached to one another via welding, crimping, by fasteners, or in another suitable manner. First housing 134 of muffler 130 is adjacent to, and faces engine 20 and second housing 136 of muffler 130 faces away from engine 20 toward the external atmosphere. First housing 134 and second housing 136 define internal chamber 142 of muffler 130. Muffler 130 includes exhaust inlet 138 which is affixed to the exhaust port (hidden from view) of engine 20. A gasket (not shown) seals the connection between inlet 138 and the exhaust port of engine 20. Muffler 130 may also include a ridge that contacts engine 20 to insure that muffler 130 is properly spaced from engine 20 when installed.

As shown in FIG. 5, internal chamber 142 of muffler 130 may be partitioned into several chambers in fluid communication with one another. For example, internal chamber 142 may include first chamber 144 and second chamber 146. Although shown herein as having two partitioned chambers, internal chamber 142 may define a greater or lesser number of partitioned chambers within muffler 130. Baffles 152, 154 separate first chamber 144 and second chamber 146 and provide venturi device 160 to permit fluid communication of exhaust gases between first chamber 144 and second chamber 146.

Baffle 152 includes formed and/or stamped portion 155 having a substantially hemispherical cross-sectional shape. Baffle 154 includes formed and/or stamped portion 150 having a substantially hemispherical cross-sectional shape. Portions 155, 150 may define secondary or auxiliary air intake device 160 which provides fluid communication between first chamber 144 and second chamber 146. Device 160 may be formed as a venturi device and may have a substantially circular or spherical cross-sectional shape. First housing 134 may include at least one air inlet port in the form of aperture 162 formed therein adjacent or proximate device 160 in order to provide secondary or auxiliary air to the flow of exhaust gases through internal chamber 142 of muffler 130, as described below.

Device 160 may include inlet end 164, outlet end 166, and constricted portion 168 therebetween. In an exemplary embodiment, inlet end 164, outlet end 166, and constricted portion 168 all form a substantially circular or spherical cross-sectional shape. Inlet end 164 may have a larger circular or spherical cross-sectional shape than the circular or spherical cross-sectional shape of outlet end 166, and constricted portion 168 has a smaller circular or spherical cross-sectional shape than the circular or spherical cross-sectional shapes of both inlet end 164 and outlet end 166. In an exemplary embodiment, aperture 162 is located near constricted portion 168 of device 160. The circular or spherical cross-section of device 160 is taken along a plane substantially perpendicular to the flow of exhaust gases through device 160. A drop in the exhaust pressure upstream of a secondary air intake device may be provided by wire mesh 169 positioned in chamber 148 connected to inlet end 164 of device 160 or positioned in chamber 144 which traps any oil entrained within the exhaust stream to thereby extend the life of the catalyst(s). Alternatively, the pressure drop may be provided by a reducing catalyst, as discussed below.

Chamber 142 may include catalyst 170 for performing the function of a catalytic converter, as described below. In one embodiment, catalyst 170 may be positioned in device 160 near outlet end 166. Second housing 136 may include an outlet in the form of a plurality of apertures 158 for fluid communication between second chamber 146 and the external atmosphere.

Referring still to FIG. 5, the flow of gaseous fluids through muffler 130 is shown by arrows A, B, C, and D. Untreated exhaust gases, represented by arrows A, leave engine 20 (FIG. 1) and pass through exhaust inlet 138 of muffler 130 into first chamber 144. The untreated exhaust gases then proceed into chamber 148 which, as described above, reduces the exhaust pressure from the exhaust port of the engine such that sub-atmospheric pressures may be generated within secondary air intake device 160 to draw secondary air into the exhaust stream. Chamber 148 may include a reducing catalyst upstream of secondary air intake device 160 for reducing NOx within the oxygen-deficient, rich exhaust upstream of secondary air intake device 160. The reducing catalyst may be in the form of a coating on wire mesh 169, for example. The oxygen by-product of the reducing catalyst may also facilitate the operation of a three-way or oxidizing catalyst located downstream of secondary air intake device 160. Also, a plurality of apertures may be provided in a portion of baffle 152 formed at a right angle to the portion of baffle 152 including stamped portion 155. The apertures facilitate a drop in the exhaust pressure prior to entering secondary air intake device 160, similar to apertures 53 in baffle 52, described above with reference to FIG. 2.

The exhaust gases next proceed into inlet end 164 of secondary air intake device 160. As the untreated exhaust gases proceed through device 160, a venturi effect occurs when the exhaust gases move through constricted portion 168, thereby dropping the pressure of the fluid within constricted portion 168 to sub-atmospheric pressure. The drop in pressure forces secondary or auxiliary atmospheric air, represented by arrows B, to be drawn into the exhaust stream through aperture 162 in first housing 134 so that mixing of the untreated exhaust gases and the secondary air occurs in diverging section or outlet end 166. The mixing of the secondary air and the untreated exhaust gases continues in second chamber 146 disposed downstream of device 160.

The exhaust gas/secondary air mixture, represented by arrows C, then proceeds into second chamber 146 which may include catalyst 170, for example, a monolithic catalyst bed or a catalytic converter, which is used to treat the exhaust gases to reduce or eliminate the hydrocarbon, carbon monoxide, and/or nitrous oxide emissions from the exhaust gases. Catalyst 170 may be in the form of a wire mesh or a ceramic monolith material coated with a metal catalyst, for example, platinum, rhodium, and/or palladium, and the ceramic material may be a cell-like structure having a multiplicity of passages that extend through the structure. The secondary air introduced into the exhaust gases upstream of the catalyst provides the necessary oxygen for the catalyst in treating the exhaust gases. The treated exhaust gas, represented by arrows D, then exits muffler 130 to the external atmosphere via apertures 158 in second housing 136.

The secondary air intake device 160 and aperture 162 may be sized to draw into the exhaust stream an amount of air sufficient to create, for example, a lean or a stoichiometric ratio between the oxygen in the secondary air and any uncombusted or partially combusted hydrocarbons in the exhaust. For a stoichiometric ratio, the catalyst 170 may be a three-way catalyst which removes NOx, hydrocarbons and carbon monoxide or, for a lean ratio, the catalyst 170 may be an oxidizing catalyst which removes hydrocarbons and carbon monoxide. Thus, the present muffler may include different arrangements of catalyst types, as desired. For example, the muffler may include only a three-way catalyst downstream of secondary air intake device 160, or may include a reducing catalyst upstream of secondary air intake device 160, together with an oxidizing catalyst downstream of secondary air intake device 160.

Although shown in FIG. 5 with a 90° bend between outlet end 166 of device 160 and catalyst 170, catalyst 170 may be positioned anywhere in second chamber 146.

Figure 6:
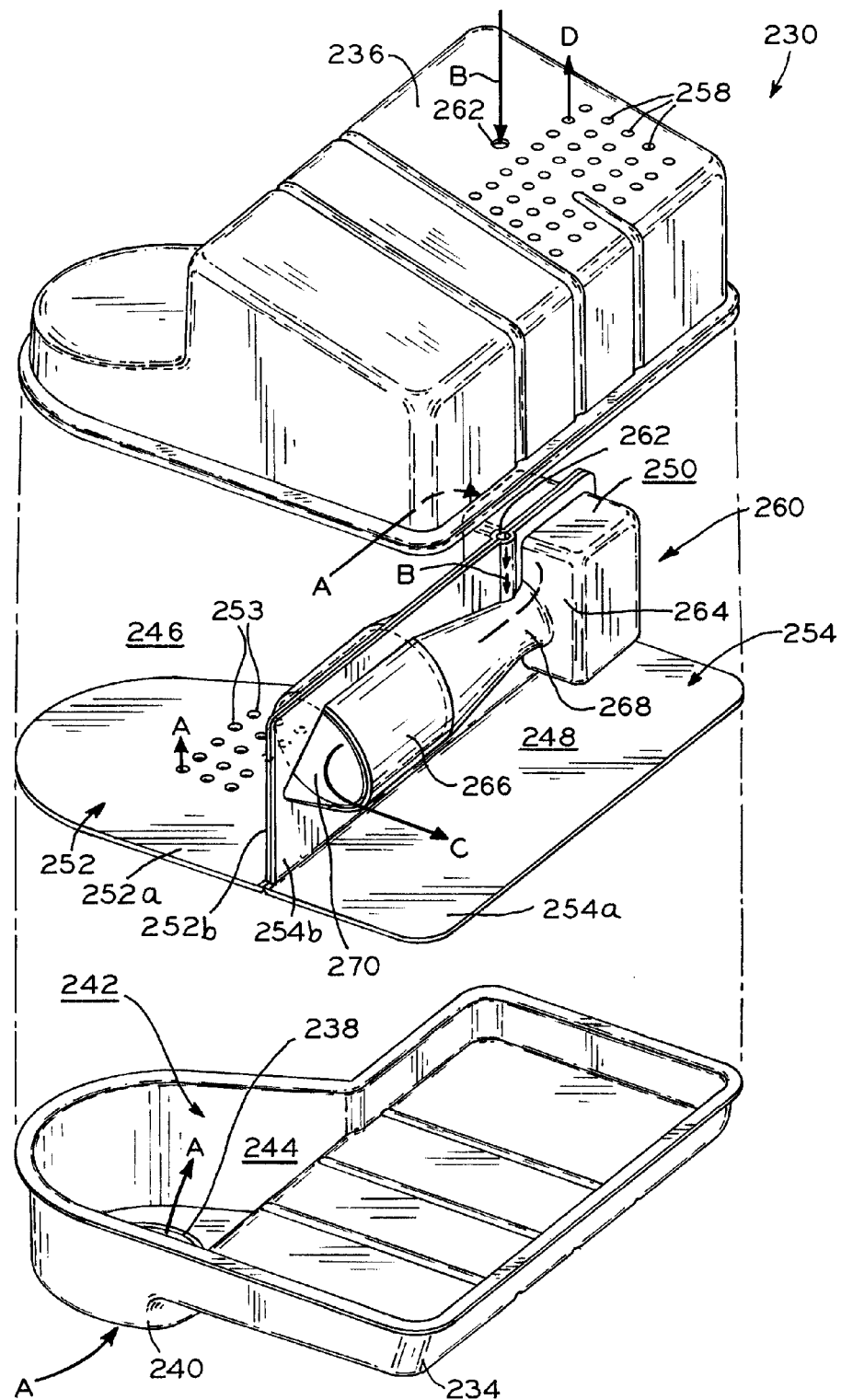
FIG. 6 is an exploded perspective view of another alternative embodiment muffler.

Referring now to FIGS. 6 and 7, an alternative embodiment muffler 230 includes an outer shell including first housing 234 and second housing 236 attached to one another via welding, crimping, by fasteners, or in another suitable manner. First housing 234 of muffler 230 is adjacent to, and faces engine 20 (FIG. 1) and second housing 236 of muffler 230 faces away from engine 20 toward the external atmosphere. First housing 234 and second housing 236 define internal chamber 242 of muffler 230. Muffler 230 includes exhaust inlet 238 which is affixed to the exhaust port (hidden from view) of engine 20. A gasket (not shown) seals the connection between inlet 238 and the exhaust port of engine 20. Muffler 230 may also include ridge 240 which insures that muffler 230 is properly spaced from engine 20.

As shown in FIG. 6, internal chamber 242 of muffler 230 may be partitioned into several chambers in fluid communication with one another. For example, internal chamber 242 may include first chamber 244, second chamber 246, and third chamber 248. Although shown herein as having three partitioned chambers, internal chamber 242 may define a greater or lesser number of partitioned chambers within muffler 230. Baffle 252 separates first chamber 244 and second chamber 246 and may include a plurality of apertures 253 to permit fluid communication of exhaust gases between first chamber 244 and second chamber 246, such that baffle 252 functions to at least partially block the exhaust flow from the exhaust port of the engine to provide a drop in the exhaust pressure upstream of the secondary air intake device of muffler 230, described below, without inhibiting the exhaust flow to the extent that the performance of the engine may be compromised. Alternatively, a drop in the exhaust pressure upstream of the secondary air intake device may also be provided by a wire mesh 269 (FIG. 7) in chamber 250 which traps any oil entrained within the exhaust stream to thereby extend the life of the catalyst(s), or the pressure drop may be provided by a reducing catalyst, as discussed below.

Baffle 252 may be formed with an "L-shaped" profile with baffle portion 252a separating first chamber 244 and second chamber 246 and baffle portion 252b forming a portion of secondary air intake device 260. Baffle portion 252b may include a formed portion which forms at least half of chamber 250 and secondary air intake device 260.

Baffle 254 separates first chamber 244 and third chamber 248 and also separates second chamber 246 and third chamber 248. Baffle 254 may also be formed with an "L-shaped" profile with baffle portion 254a separating first chamber 244 and third chamber 248 and baffle portion 254b forming a portion of secondary air intake device 260. Baffle portion 254b may include a formed portion which forms a complementary half of chamber 250 and secondary air intake device 260 relative to the formed portion of baffle portion 252b. Third chamber 248 may include catalyst 270 for performing the function of a catalytic converter, as described below. Second housing 236 may include an outlet in the form of a plurality of apertures 258 for fluid communication between third chamber 248 and the external atmosphere.

Internal chamber 242 may include secondary or auxiliary air intake device 260 which provides fluid communication between second chamber 246 and third chamber 248. Device 260 may be formed as a venturi device and may have a substantially circular or spherical cross-sectional shape. Second housing 236 may include air inlet ports in the form of at least one aperture 262 formed therein adjacent or proximate device 260 in order to provide secondary or auxiliary air to the flow of exhaust gases through internal chamber 242 of muffler 230, as described below.

Referring to FIGS. 6 and 7, device 260 may include inlet end 264, outlet end 266, and constricted portion 268 therebetween. In an exemplary embodiment, inlet end 264, outlet end 266, and constricted portion 268 all form a substantially circular or spherical cross-sectional shape. Inlet end 264 may have a larger circular or spherical cross-sectional shape than the circular or spherical cross-sectional shape of outlet end 266, and constricted portion 268 has a smaller circular or spherical cross-sectional shape than the circular or spherical cross-sectional shapes of both inlet end 264 and outlet end 266. In an exemplary embodiment, aperture 262 is located near constricted portion 268 of device 260. The circular or spherical cross-section of device 260 is taken along a plane substantially perpendicular to the flow of exhaust gases through device 260. Inlet end 264 may be formed as part of chamber 250.

Referring again to FIG. 6, the flow of gaseous fluids through muffler 230 is shown by arrows A, B, C, and D. Untreated exhaust gases, represented by arrows A, leave engine 20 (FIG. 1) and pass through exhaust inlet 238 of muffler 230 into first chamber 244. The untreated exhaust gases then proceed into second chamber 246 via apertures 253 in baffle 252 which, as described above, reduces the exhaust pressure from the exhaust port of the engine such that sub-atmospheric pressures may be generated within secondary air intake device 260 to draw secondary air into the exhaust stream. First chamber 244 and/or chamber 250 may optionally include a reducing catalyst upstream of secondary air intake device 260 for reducing NOx within the oxygen-deficient, rich exhaust upstream of secondary air intake device 260, such as device 269 (FIG. 7). The reducing catalyst may be in the form of a coated wire mesh, for example. The oxygen by-product of the reducing catalyst may also facilitate the operation of a three-way or oxidizing catalyst located downstream of secondary air intake device 260.

The exhaust gases proceed through apertures 249 of chamber 250 and into inlet end 264 of secondary air intake device 260. As the untreated exhaust gases proceed through device 260, a venturi effect occurs when the exhaust gases move through constricted portion 268, thereby dropping the pressure of the fluid within constricted portion 268 to sub-atmospheric pressure. The drop in pressure forces secondary or auxiliary atmospheric air, represented by arrows B, to be drawn into the exhaust stream through aperture 262 so that mixing of the untreated exhaust gases and the secondary air occurs in diverging section or outlet end 266. The mixing of the secondary air and the untreated exhaust gases continues in third chamber 248 disposed downstream of device 260.

The exhaust gas/secondary air mixture, represented by arrows C, then proceeds from third chamber 248 which may include catalyst 270, for example, a monolithic catalyst bed or a catalytic converter, which is used to treat the exhaust gases to reduce or eliminate the hydrocarbon, carbon monoxide, and/or nitrous oxide emissions from the exhaust gases. Catalyst 270 may be in the form of a wire mesh or a ceramic monolith material coated with a metal catalyst, for example, platinum, rhodium, and/or palladium, and the ceramic material may be a cell-like structure having a multiplicity of passages that extend through the structure. The secondary air introduced into the exhaust gases upstream of catalyst 270 provides the necessary oxygen for catalyst 270 in treating the exhaust gases. The treated exhaust gas, represented by arrows D, then exits muffler 230 to the external atmosphere via apertures 258 in second housing 236.

The secondary air intake device 260 and aperture 262 may be sized to draw into the exhaust stream an amount of air sufficient to create, for example, a lean or a stoichiometric ratio between the oxygen in the secondary air and any un-combusted or partially combusted hydrocarbons in the exhaust. For a stoichiometric ratio, catalyst 270 may be a three-way catalyst which removes NOx, hydrocarbons and carbon monoxide or, for a lean ratio, catalyst 270 may be an oxidizing catalyst which removes hydrocarbons and carbon monoxide. Thus, the present muffler may include different arrangements of catalyst types, as desired. For example, the muffler may include only a three-way catalyst downstream of secondary air intake device 260, or may include a reducing catalyst upstream of secondary air intake device 260, together with an oxidizing catalyst downstream of secondary air intake device 260.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An internal combustion engine, comprising:
a muffler attached to the engine, said muffler comprising a housing having an inlet, an outlet, and at least one auxiliary air inlet, said housing comprising a first chamber in fluid communication with said inlet and a second chamber in fluid communication with said outlet;
an auxiliary air intake device associated with said muffler and disposed within said housing between said first chamber and said second chamber, said auxiliary air intake device comprising a single metal sheet having a stampable arcuate section therein with a restriction between a first end of the arcutate section and a second end of the arcuate section, wherein said metal sheet is affixed to a substantially planar inner wall of the housing such that at least one auxiliary air inlet embedded in the housing is positioned proximal to the restriction, wherein the first end is in fluid communication with said first chamber the second end is in fluid communication with said second chamber, and a fluid passage capable of producing a venturi effect is situated proximal the restriction, between first and second ends;
a first catalytic converter disposed within said muffler housing upstream of said auxiliary air intake device;
and a second catalytic converter disposed within said muffler housing downstream of said auxiliary air intake device, whereby exhaust gases passing through said auxiliary air intake device draw in auxiliary air directly across the housing and into the fluid passage through said at least one auxiliary air inlet prior to passing through said second catalytic converter.

2. The engine of claim 1, wherein said auxiliary air intake device section comprises a piece of sheet metal formed in a substantially half-cylindrical arcuate shape mated with the substantially planar inner wall of said outer shell.

3. The engine of claim 2, wherein said muffler further comprises at least one internal baffle locating and supporting said piece of sheet metal.

4. The engine of claim 1, wherein said muffler further comprises a pressure drop mechanism upstream of said auxiliary air intake device.

5. The engine of claim 1, wherein a cross-sectional dimension of said restriction portion is less than a cross-sectional dimension of said inlet portion and said outlet portion.

* * * * *